United States Patent [19]

Shimada et al.

[11] Patent Number: 5,012,677
[45] Date of Patent: May 7, 1991

[54] DIFFERENTIAL PRESSURE TRANSMITTER

[75] Inventors: Satoshi Shimada, Hitachi; Yasushi Shimizu, Katsuta; Seiichi Ugai, Hitachi, all of Japan

[73] Assignee: Hitachi, Ltd., Tokyo, Japan

[21] Appl. No.: 275,580

[22] Filed: Nov. 23, 1988

[30] Foreign Application Priority Data

Nov. 27, 1987 [JP] Japan .................. 62-297629

[51] Int. Cl.$^5$ .................... G01L 9/06
[52] U.S. Cl. .................... 73/721; 73/727; 73/756; 338/4
[58] Field of Search .......... 73/756, 720, 721, 726, 73/727, 706, 708, DIG. 4, 182; 338/4

[56] References Cited

U.S. PATENT DOCUMENTS

| 4,222,277 | 9/1980 | Kurtz et al. | 73/727 |
| 4,264,889 | 4/1981 | Yamamoto et al. | 73/72 |
| 4,528,855 | 7/1985 | Singh | 73/721 |
| 4,841,776 | 6/1989 | Kawachi et al. | 73/706 |

FOREIGN PATENT DOCUMENTS

| 3047619 | 9/1985 | Fed. Rep. of Germany . |
| 3437668 | 4/1986 | Fed. Rep. of Germany . |
| 60-61637 | 9/1985 | Japan . |
| 0746221 | 7/1980 | U.S.S.R. | 73/720 |

Primary Examiner—Donald O. Woodiel
Attorney, Agent, or Firm—Kenyon & Kenyon

[57] ABSTRACT

A differential pressure transmitter is an improvement over the drawbacks of conventional apparatuses and provides a differential pressure transmitter which compensates for adverse effects of a static pressure by using a static pressure detecting piezoresistive gauge. The transmitter includes a highly sensitive static pressure sensor with high outputs, and a composite sensor with small crosstalk between the static pressure sensor and a differential pressure sensor. The differential pressure transmitter is constructed of semiconductor sensor substrate and a fixed mount on which the sensor substrate is securely mounted; whereby the differential pressure of a fluid is detected by utilizing the difference in Young's modulus between the sensor substrate and the mount. The sensor substrate is processed on one side or on both sides to make a part of the sensor substrate thinner than the surrounding parts and thereby cause a peak stress due to a static pressure load to occur at the thin part, and a change in resistance of a semiconductor piezoresistive gauge formed at that thin portion is detected.

1 Claim, 6 Drawing Sheets

DIFFERENTIAL PRESSURE TRANSMITTER

BACKGROUND OF THE INVENTION

This invention relates to a differential pressure transmitter and more particularly to a differential pressure transmitter which can properly compensate for errors caused by high static pressure.

As described in the Japanese Patent Application Laid-Open No. 120142/1983, No. 61637/1985 and No. 56465/1986, and the Japanese Utility Model Application Laid-Open No. 167432/1983, conventional pressure differential transmitters detect a static pressure by utilizing a differential pressure detecting diaphragm and a semiconductor piezoresistive gauge provided on the same chip on which the diaphragm is mounted. With this construction, however, there is a high level of crosstalk between the differential pressure detecting gauge and the static pressure detecting gauge, which makes it difficult to compensate for errors caused by high static pressures. This is a major obstacle in the way to improving the accuracy of the differential pressure transmitter.

U.S. Pat. No 4,528,855 discloses a differential pressure transmitter in which a static pressure applied to the upper and lower surfaces of an annular diaphragm surrounding the differential pressure sensor is used to deform the differential pressure sensor and thereby obtain changes in resistance of a plurality of semiconductor piezoresistive gauges.

Figure 1:
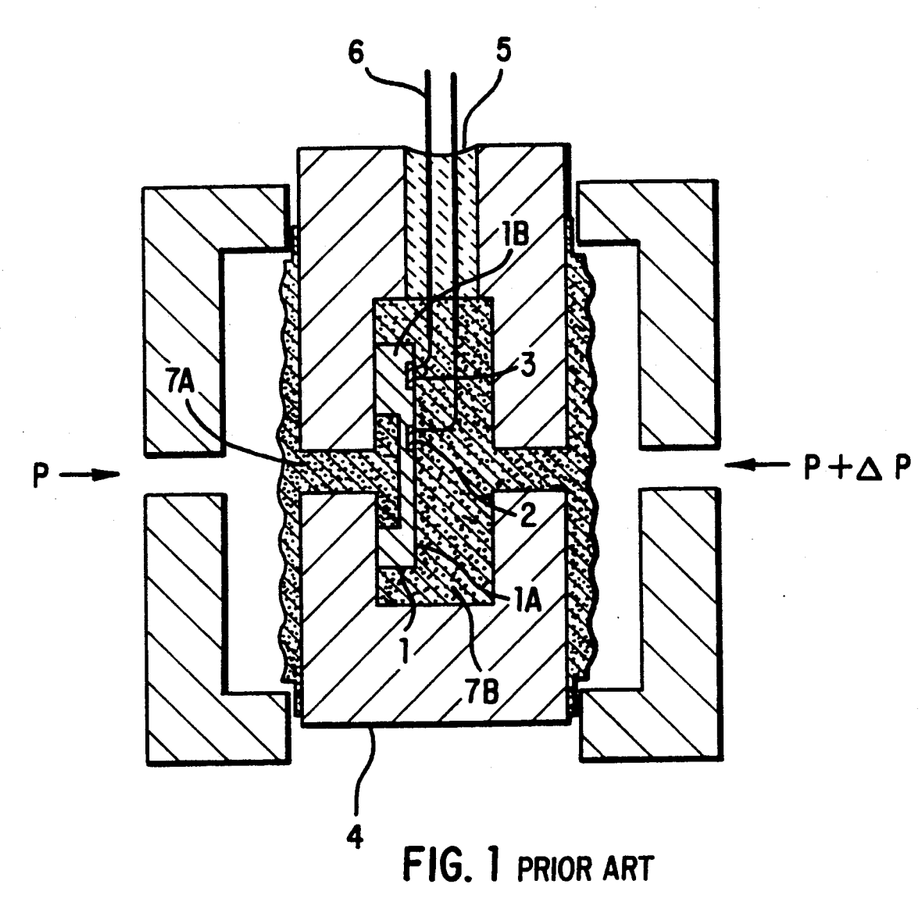
FIG. 1 is a cross-sectional view showing the construction of a conventional differential pressure transmitter.

There are many kinds of differential pressure sensors that detect a differential pressure and a temperature. FIG. 1 is a vertical cross section showing one representative construction of the differential pressure transmitter currently in use, which is introduced in the Japanese Patent Application Laid-Open No. 61637/1985. A silicon diaphragm 1 has on a thin portion 1A a semiconductor piezoresistive gauge group 2 that senses a differential pressure Δp and, on a fixed thick portion 1B, a semiconductor piezoresistive gauge 3 that senses a temperature. Both of these gauges are diffused into the silicon diaphragm 1. These piezoresistive gauges are formed so that they will not respond to a high static pressure P, and each of the gauges is connected to external circuits through lead wires 6 that are extracted from an airtight hermetic sealed terminal 5. Hence, the semiconductor piezoresistive gauge group 2 generates a signal proportional to a differential pressure Δp and the semiconductor piezoresistive gauge 3 produces a signal proportional to a temperature T. The external circuit will then produce a differential pressure signal without errors caused by temperature variations.

A static pressure P applied on both sides of the silicon diaphragm 1 of the differential pressure transmitter is normally as high as 100 atmospheres. At such a high static pressure, any imbalance in liquid contraction between chambers 7A, 7B on both sides filled with liquid or any deformation of a cage 4 will cause deformation in the silicon diaphragm 1. This in turn results in a change in resistance of the semiconductor piezoresistive gauge group 2. Hence, the signal representing a differential pressure is superimposed with a signal produced by a static pressure, making it impossible to output a correct differential pressure signal. In other words, the signal output from the differential pressure transmitter is affected by the static pressure and contains errors. To prevent errors from being caused by the static pressure requires that the amounts of liquid sealed in the chambers 7A, 7B be strictly equal to each other and that the cage 4 be given a greater rigidity so that it will not be deformed by the static pressure P. These requirements constitute a large constraint in design and manufacture, inhibiting further reduction in size and cost of the differential pressure transmitter.

SUMMARY OF THE INVENTION

An object of the present invention is to provide a differential pressure transmitter which makes improvements on the above drawback by forming a static pressure detecting gauge substantially isolated from other gauges, and particularly to realize a highly sensitive static pressure detecting sensor with high outputs and a composite sensor with small crosstalk between the static pressure sensor and a differential pressure sensor.

The differential pressure transmitter of the present invention comprises: at least one substrate; a mount to hold the substrate; and at least one piezoresistive gauge formed on the substrate, whereby the substrate is so formed that a peak stress develops near the piezoresistive gauge.

The present invention relates to a pressure differential transmitter which includes of a sensor substrate (formed of, say, a semiconductor) and a mount (which may be fixed) to hold the sensor substrate, and which detects the differential pressure of a fluid by taking advantage of the difference in the Young's modulus between the substrate and the mount. The sensor substrate is processed on one side or on both sides to make one portion thinner than the surrounding portions, and a change in resistance of a piezoresistive gauge located at the thin portion and formed of such material as semiconductors is detected. That is, the sensor substrate is so formed that a peak stress due to a static pressure load acts on the piezoresistive gauge.

This invention also relates to a differential pressure transmitter which consists of a sensor substrate and a fixed mount on which the sensor substrate is securely mounted, and which detects the differential pressure of a fluid by taking advantage of the difference in the Young's modulus between the sensor substrate and the fixed mount. The thin portion of the sensor substrate is formed with a differential pressure sensor. The thick portion of the substrate is processed on one side or on both sides to make a part of the thick portion thinner than the surrounding parts so that a peak stress caused by a static pressure load occurs at that thin part. A static pressure sensor is formed on that thinner part of the thick portion to detect a change in resistance of a semiconductor piezoresistive gauge. The sensor substrate is formed with a groove between the differential pressure sensor and the static pressure sensor to eliminate crosstalk between the two sensors.

BRIEF DESCRIPTION OF THE DRAWINGS

The present invention will be more apparent from the following detailed description, when taken in conjunction with the accompanying drawings.

DETAILED DESCRIPTION OF THE INVENTION

The operating principle of the present invention is as follows. A static pressure causes a deformation in a composite member consisting of members with different moduli of elasticity, such as a silicon plate and a glass plate, and this deformation is detected as an electric signal by a piezoresistive element diffused into the silicon plate. The silicon plate is formed with a notched groove to provide a stress-concentrated portion where the piezoresistive element is installed so that large changes in resistance can be obtained. A differential pressure detecting gauge and a static pressure detecting gauge, both mounted on the silicon plate, are structurally isolated from each other.

The action of the differential pressure transmitter according to the present invention will be explained with reference by to FIG. 2(a) to (c). As illustrated in (c) a single crystal plate 8 of such a material as silicon, which serves as a sensor substrate, is formed at one location with a groove 9 which is triangular in cross section. A piezoresistive element 10 is formed on the upper surface of the thin portion of the crystal plate 8. This single crystal plate 8 is bonded to a mount made of a material with a different modulus of elasticity such as bolosilicate glass 11. When applied with a static pressure P, the single crystal plate 8 and the glass mount 11 are subject to a compressive stress over the entire surface, which is equivalent to the static pressure P. Because of the difference in the modulus of elasticity, the glass plate 11 produces a larger deformation. Since the two members are bonded together, the single crystal plate 8 is deformed into a convex shape by the compressive deformation of the glass plate 11. The stress $\sigma$ on the upper surface of the single crystal plate 8 will be as shown in (a) of FIG. 2(a). The thin portion develops the maximum stress by the notch effect. In practice, the thin portion is so designed that it will not fracture at the maximum stress when applied with a repetitive load. In this portion there are formed semiconductor piezoresistive gauges G1 to G4 as shown in (b). Let us assume that the crystal directions of the silicon single crystal plate 8 are vertical and lateral or in <110> directions. Then a P-type element will have a change in resistance $\Delta R$, which is expressed as $$\Delta R = R \cdot \frac{\pi 44}{2} (\sigma_l - \sigma_t) \quad (1)$$

where

R: reference resistance $\pi 44$: coefficient of shear for the piezoresistive element $\sigma_l$: stress in the longitudinal direction caused by a static pressure $\sigma_t$: stress in the lateral direction The piezoresistive gauges of a first orientation G1, G4 and those of a second orientation G2, G3 produce resistance changes of opposite signs, and they are connected to form a bridge that produces an output voltage in proportion to the static pressure. These four piezoresistive gauges G1 to G4 are diffused into the silicon plate at one time by a known semiconductor manufacturing process, so that the difference in resistance-temperature coefficient among these gauges is very small, which means that the output voltage change due to variations in ambient temperature is small by using a wheatstone budge circuit of these four gauges G1 to G4. Thus, it is possible to obtain a large output voltage which is proportional to the static pressure but which is not affected by temperature changes.

Figure 3:
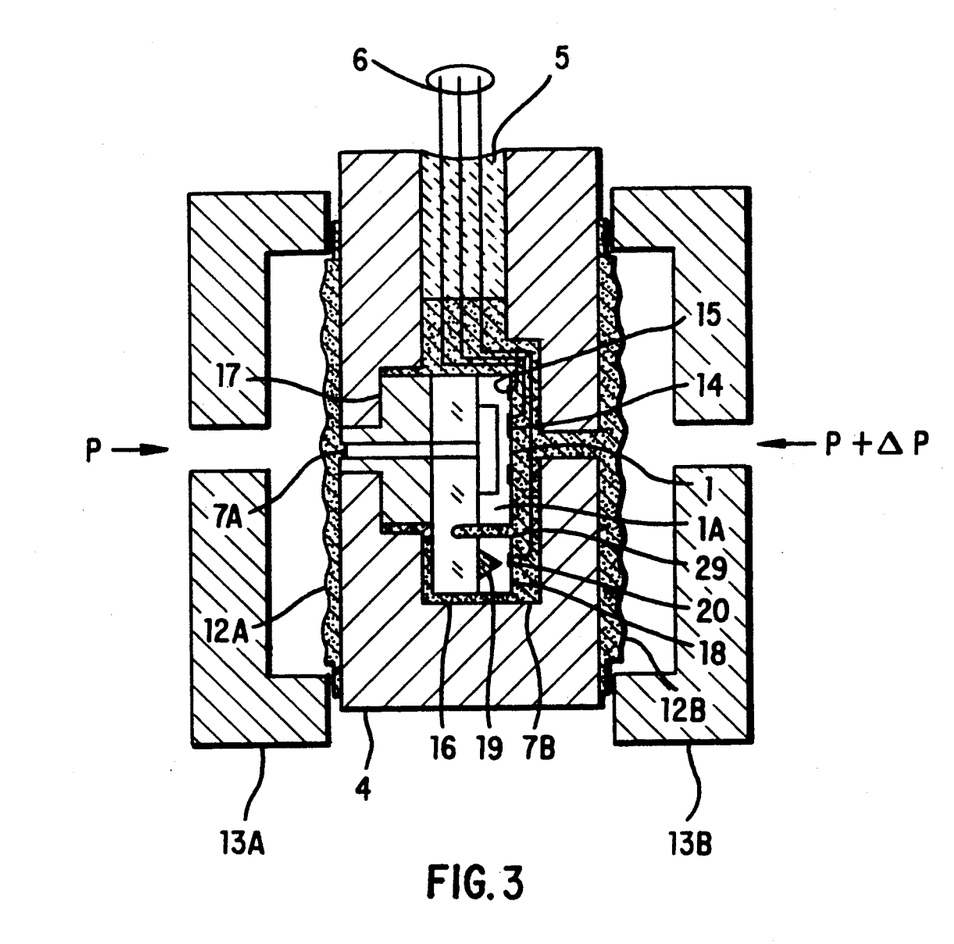
FIG. 3 is a vertical cross-sectional view showing the construction of a multiple function sensor as one embodiment of the present invention.

In this invention, a separation groove 29 is formed in a part of the sensor substrate, as shown in FIG. 3, to separate the differential pressure detection gauge portion from the static pressure detection gauge portion. This enables accurate detection of static pressure with little crosstalk.

Now, by referring to FIGS. 3 and 4, one embodiment of the present invention will be explained in detail.

FIG. 3 is a vertical cross section showing the construction of a multiple function sensor as one embodiment of the present invention, as applied to the semiconductor piezoresistive gauge type differential pressure transmitter. In FIG. 3, the fixed thick portion 1A of the silicon diaphragm 1 made of a single crystal silicon plate to detect a differential pressure is fixed hermetically to a mount 1B. The airtight hermetic sealed glass terminal 5 installed in the cage 4 extracts signals from the piezoresistive gauges through lead wires 6 to external circuits. Seal diaphragms 12A, 12B are hermetically fixed along the periphery to each side of the cage 4. Chambers 7A, 7B divided by the silicon diaphragm 1 are filled with liquid such as silicone oil. Denoted 13A, 13B are flanges to clamp the cage 4 to apply a differential pressure $\Delta p$ and a static pressure P to the differential pressure sensor and the static pressure sensor.

The thin silicon diaphragm 1A deforms according to the differential pressure $\Delta p$, i.e., a pressure difference between the sealed liquids in the chambers 7A, 7B on each side of the diaphragm. Diffused on the thin portion of the diaphragm is a semiconductor piezoresistive gauge group 14 which detects the differential pressure by transforming the deformation of the diaphragm into electric signals. Also a thin film lead terminal is formed on the gauge group by evaporation. Into the upper surface of the peripheral fixed thick portion of the silicon diaphragm 1 is diffused a semiconductor piezoresistive gauge 15, on which a thin film lead terminal is formed by evaporation.

In diffusing a boron, a p-type impurity, into a plane (100) of the single crystal silicon plate, the piezoresistive gauges may be arranged along a shaft <100> where the piezoresistive coefficient becomes almost zero, so that no deformations that are caused would result in an electric signal. This arrangement is taken in forming the semiconductor piezoresistive gauge 15 for temperature detection.

A mount 16 on which the silicon diaphragm 1 is secured is made of such materials as Pyrex glass whose coefficient of thermal expansion is close to that of silicon. A post 17 that holds the mount 16 is formed of iron-nickel alloy for the same reason and a part of the post is soldered to the cage 4. The post 17 is almost equal in diameter to the single crystal plate that forms the silicon diaphragm 1, to suppress deformation of the glass substrate 16 due to the static pressure and thereby prevent any change in resistance of the piezoresistive gauge for the differential sensor on the silicon diaphragm 1. To the other part of the glass substrate 16 is secured a static pressure detecting sensor 18, which has at one part a groove 19 to form a thin portion. On the upper surface of the thin portion is diffused a piezoresistive gauge 20 for detecting the static pressure. A thin film lead terminal is evaporated over the gauge 20. The static pressure detecting sensor 18 is isolated from the differential pressure detecting diaphragm 1 by a deep groove 29 so that their deformations are independent of each other, preventing crosstalk between the differential pressure signal and the static pressure signal. As explained in FIG. 2, the static pressure sensor 18 can extract a large output signal from the piezoresistive gauge 20 corresponding to the static pressure. The groove 19 has a function of amplifying the stress and this portion of the sensor 18 is shaped like a tunnel which is filled with silicone oil, so that the static sensor does not sense the differential pressure $\Delta p$ but senses only the deformations caused by the static pressure utilizing the difference in Young's modulus between the substrate and the mount as explained in FIG. 2.

Figure 4:
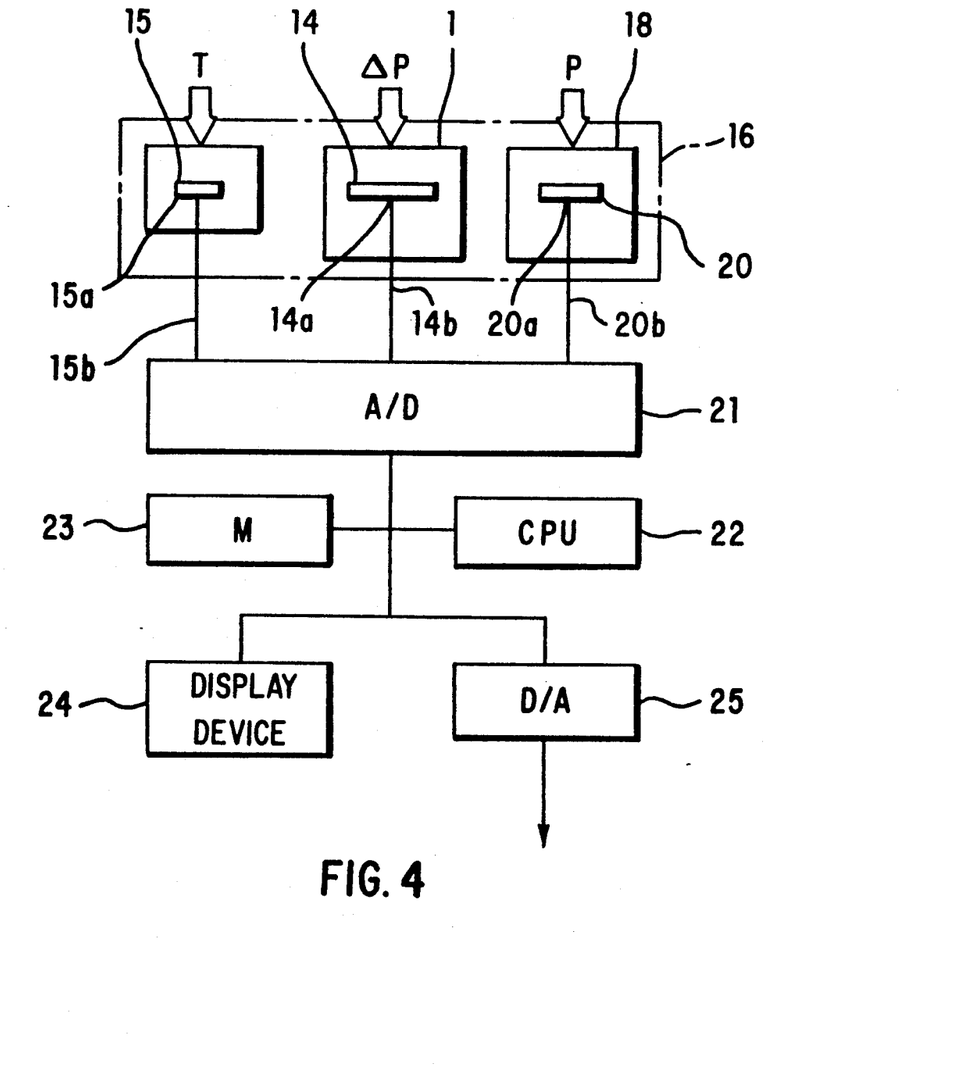
FIG. 4 is a diagram showing one example of sequence for processing detection signals from the multiple function sensor of the present invention.

FIG. 4 shows a block diagram the multiple function sensor of the present invention. When the differential pressure detecting diaphragm 1 is applied with a pressure P on one side and a pressure (P+$\Delta p$) on the other side, the differential pressure detecting gauge group 14 detects the differential pressure $\Delta p$. The signal of the gauge group 14 is fed through the lead terminal and a lead 14b to an A/D converter 21. The semiconductor piezoresistive gauge 20 for static pressure which is on the thin portion of the sensor 18 detects the static pressure P. The temperature detecting semiconductor piezoresistive gauge 15 on the thick portion of the diaphragm 1 detects the temperature T. Signals from these sensors are fed to the A/D converter 21 through the lead terminal 20 and lead wire 20b, and through the lead terminal and lead wire 15b. The A/D converter 21, after amplifying these signals to specified levels as required, performs A/D conversion on these signals and then feeds them to CPU22. CPU22 performs specified calculations on the digitally converted signals from the A/D converter 21 to remove effects of the static pressure P and make adjustment for the effects of temperature T. Thus, CPU 22 outputs a differential signal which is precisely proportional only to the differential pressure $\Delta p$. Designated 23 is a memory containing data and calculation programs necessary for CPU22 to perform calculation. The differential pressure signal is displayed on a display device 24 and is also reconverted to an analog signal by a D/A converter 25 before being sent to other circuits. By providing a separate switching device, it is possible to display and transmit signals which are proportional to the static pressure P and temperature T, in addition to the differential signal that is strictly in proportion to only the differential pressure $\Delta p$. It is also possible to compensate for external disturbances on the differential pressure signals.

Figure 5:
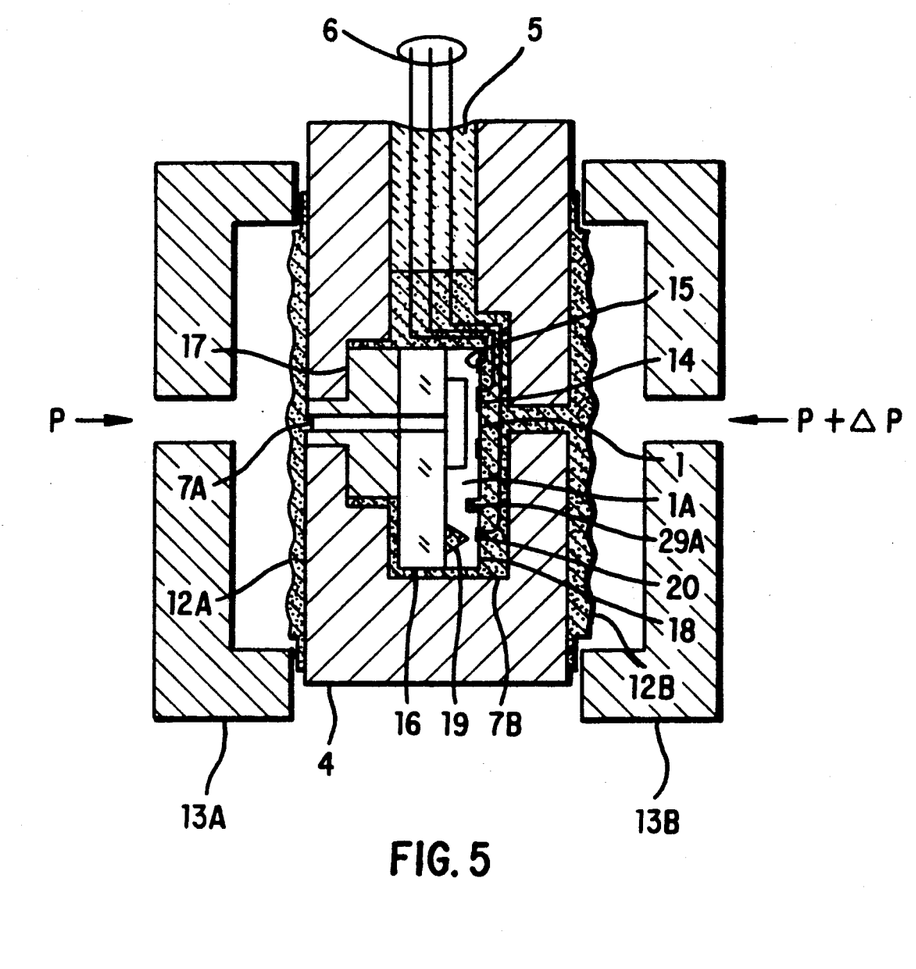
FIGS. 5 and 6 are vertical cross-sectional views of alternate embodiments of the present invention.

FIG. 5 shows a variation of the differential pressure transmitter of FIG. 3. In this example the isolation groove 29A stops midway in the silicon single crystal plate 1. This construction also significantly reduces the crosstalk between the differential pressure detecting piezoresistive gauge 14 and the static pressure detecting piezoresistive gauge 20. The deeper the separation groove, the smaller the amount of crosstalk will be. When the depth of the isolation groove is 0.2 mm, the amount of crosstalk reduces to about one fifth of that when there is no groove. Although this kind of groove can be formed by a dicing machine, it is preferable to use a chemical method such as alkaline etching or acid etching because the chemical method causes less machining strains or damages to the sensor.

Figure 6:
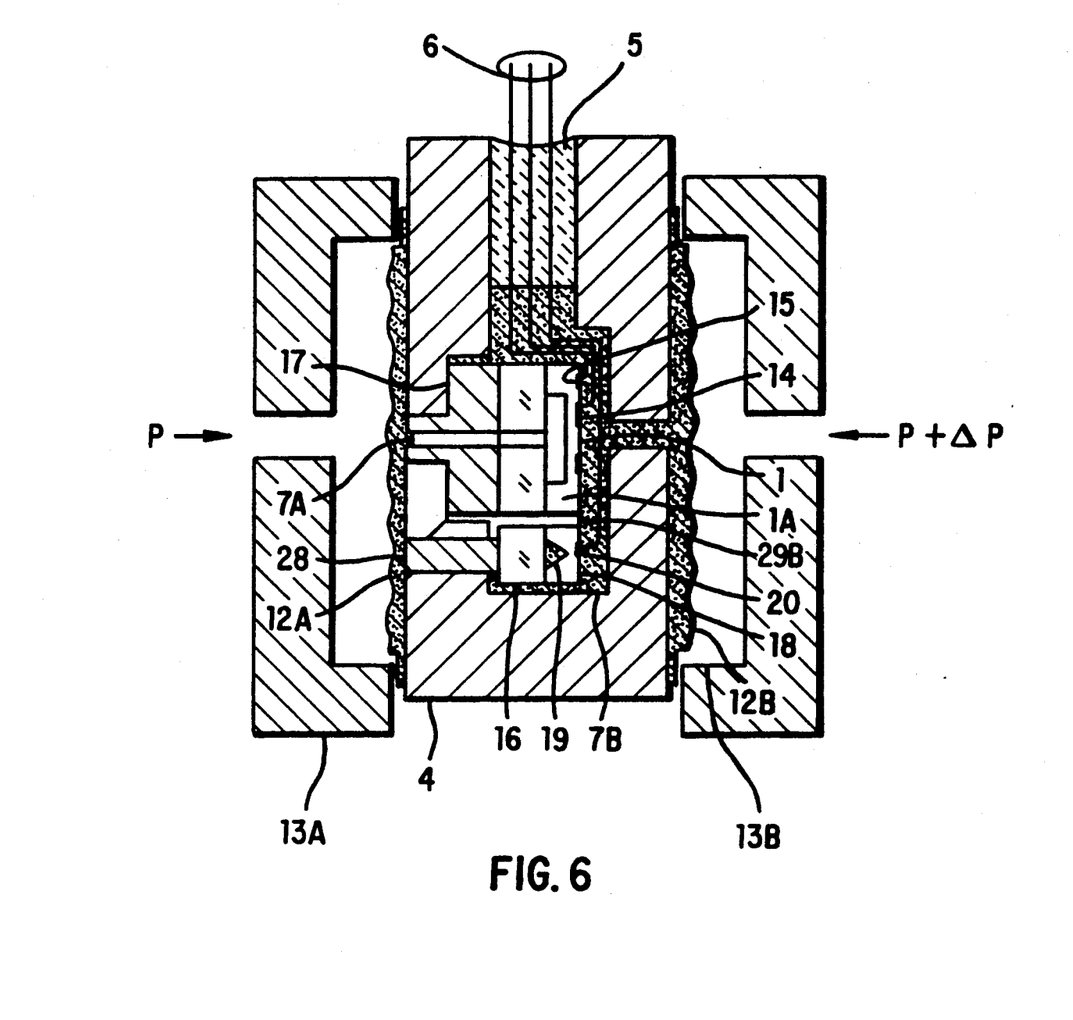

FIG. 6 shows another variation. In this example the static pressure sensor 18 is formed completely separate from other sensors so that it is not affected by the differential pressure. That is, the differential pressure sensor 1 and the static pressure sensor 18 are independent of each other. The static pressure sensor 18 produces an output which solely represents the static pressure, with no crosstalk or interference from the differential sensor 1. Therefore, the compensation of errors caused by high static pressure in the differential pressure transmitter including a pressure receiving portion becomes very simple The advantages of the above embodiments according to the present invention may be summarized as follows.

(1) An output can be obtained which is proportional to the differential pressure $\Delta p$ and which is removed of errors resulting from deformations of the cage 4 caused by the static pressure P.

(2) As the ambient temperature T changes, the characteristics of the piezoresistive gauges 14, 20 that detect the differential pressure $\Delta p$ and the static pressure P also change. However, since the output of the temperature detecting semiconductor piezoresistive gauge 15 is used to compensate for the temperature variations, it is possible to obtain outputs that are proportional to the differential pressure $\Delta p$ and to the static pressure P, respectively, and which are not affected by the temperature changes.

(3) An isolation groove is formed in a part of the sensor substrate to isolate the differential pressure detecting gauge and the static pressure detecting gauge from each other, so that the deformation of the differential pressure detecting piezoresistive gauge caused by the static pressure is small and that the deformation of the static pressure detecting piezoresistive gauge caused by the differential pressure is small. That is, the crosstalk or interference between these gauges is small, so that more precise adjustment or correction can be made, which in turn increases the precision of the differential pressure transmitter.

(4) The semiconductor piezoresistive gauges 14, 20, 15 can be formed by the semiconductor manufacturing process. The thin portion of the sensor substrate can easily be formed by a semiconductor precision fabrication technique. This in turn permits the differential pressure sensor to be formed in a smaller size.

With this invention it is possible to perform a highly sensitive static pressure detection with only a small error caused by temperature variations. It is also possible to form a sensor that has small crosstalk between the differential pressure signal and the static pressure signal These two features in turn make the temperature and static pressure compensations easy, making it possible to provide a highly accurate differential pressure transmitter.

In this invention, the difference in Young's modulus between the sensor substrate and the mounting member causes the sensor substrate to develop a stress due to static pressure. Furthermore, the sensor substrate on which a semiconductor piezoresistive gauge is mounted has its underside formed thin (or notched groove) to produce a localized stress at the gauge portion and therefore a magnified change in gauge resistance. It is thus possible to detect a static pressure acting on the sensor as a whole if there is no pressure difference between the sensor surface on which the gauge is provided and the underside of the sensor.

What is claimed is:

1. A differential pressure transmitter, comprising:
a sensor substrate;
a mount holding said sensor substrate;
a differential pressure sensor formed on one portion of said sensor substrate; and
a static pressure sensor, sensing a static pressure of a fluid by utilizing a difference in Young's modulus between the sensor substrate and the mount, formed on another portion of the sensor substrate;
wherein the sensor substrate has a first groove so that said static pressure sensor detects a peak stress caused by a static pressure, and the sensor substrate also has a second groove formed between the differential pressure sensor and the static pressure sensor to reduce crosstalk between the two sensors.

* * * * *

UNITED STATES PATENT AND TRADEMARK OFFICE
CERTIFICATE OF CORRECTION

PATENT NO. : 5,012,677
DATED : May 7, 1991
INVENTOR(S) : Satoshi Shimada, et. al.

Figure 2A:
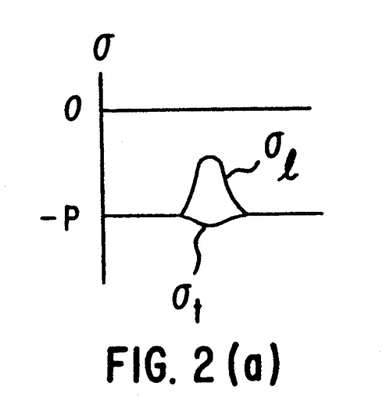
FIG. 2(a) to (c) is explanatory diagrams showing the operating principle of a static pressure sensor according to the present invention.
Figure 2B:
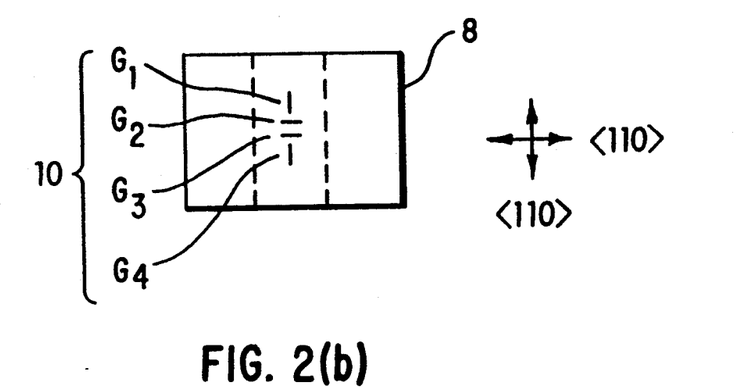
Figure 2C:
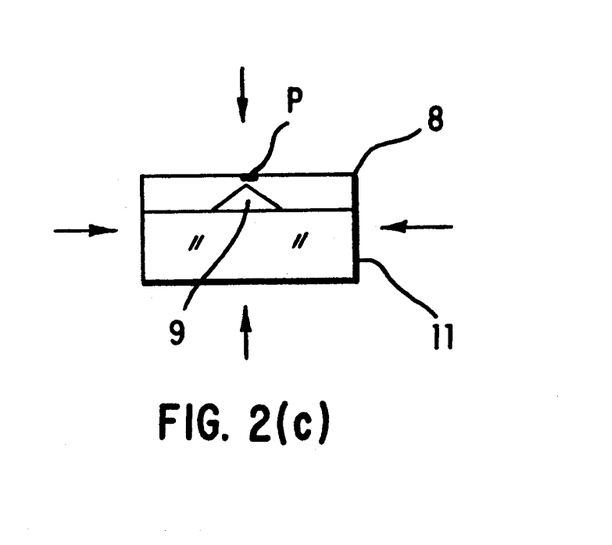

It is certified that error appears in the above-identified patent and that said Letters Patent is hereby corrected as shown below:

| Column | Line | |
|--------|------|---|
| 2 | 25 | After "includes" delete "of". |
| 2 | 66 | Change "FIG. 2(a) to (c) is" to --FIGS. 2(a) to 2(c) are--. |
| 3 | 6 | After "of" insert --an embodiment of--. |
| 3 | 26 | Delete "by"; change "FIG. 2(a) to (c)" to --FIGS. 2(a) to 2(c)--; after "in" insert --2--. |
| 3 | 44 | Delete "(a) of". |
| 4 | 27 | Change "1B" to --16--. |
| 6 | 49 | After "formed by" change "the" to --a known--. |

Signed and Sealed this

Twenty-sixth Day of January, 1993

*Attest:*

STEPHEN G. KUNIN

*Attesting Officer*   Acting Commissioner of Patents and Trademarks